(12) United States Patent
Katsumoto et al.

(10) Patent No.: US 8,204,319 B2
(45) Date of Patent: Jun. 19, 2012

(54) IMAGE COMPRESSION APPARATUS AND IMAGE COMPRESSION METHOD

(75) Inventors: Toshiyuki Katsumoto, Tokyo (JP); Nobuhiro Igi, Kanagawa (JP); Hiromasa Watanabe, Tokyo (JP); Yukio Yanagihara, Chiba (JP)

(73) Assignee: Sony Corporation, Tokyo (JP)

( * ) Notice: Subject to any disclaimer, the term of this patent is extended or adjusted under 35 U.S.C. 154(b) by 665 days.

(21) Appl. No.: 12/428,761

(22) Filed: Apr. 23, 2009

(65) Prior Publication Data

US 2009/0324114 A1 Dec. 31, 2009

(30) Foreign Application Priority Data

Jun. 26, 2008 (JP) ................................. 2008-167752

(51) Int. Cl.
*G06K 9/46* (2006.01)
(52) U.S. Cl. ............. 382/232; 342/448; 370/410; 398/1
(58) Field of Classification Search .................. 382/232, 382/234; 342/448; 370/410; 398/1
See application file for complete search history.

(56) References Cited

U.S. PATENT DOCUMENTS

| 4,704,627 | A | * | 11/1987 | Yuyama et al. | 348/43 |
| 5,612,735 | A | * | 3/1997 | Haskell et al. | 348/43 |
| 5,625,408 | A | * | 4/1997 | Matsugu et al. | 348/42 |
| 2003/0218606 | A1 | * | 11/2003 | Zhirkov et al. | 345/419 |
| 2005/0123191 | A1 | * | 6/2005 | Zhang et al. | 382/154 |
| 2007/0047040 | A1 | * | 3/2007 | Ha | 359/24 |

FOREIGN PATENT DOCUMENTS

JP 8-70473 3/1996

\* cited by examiner

*Primary Examiner* — Matthew Bella
*Assistant Examiner* — Eueng-Nan Yeh
(74) *Attorney, Agent, or Firm* — Oblon, Spivak, McClelland, Maier & Neustadt, L.L.P.

(57) ABSTRACT

An image compression apparatus includes: first and second imaging sections for capturing an image of a subject to generate first and second image signals, respectively; first and second encoding sections for encoding the first and second image signals to generate first and second image data, respectively; first and second distance measuring sections for measuring a distance to the subject for each of image blocks, at the same time as the first and second imaging sections perform image capturing, to generate first and second distance information, respectively; first and second multiplexing sections for generating first and second multiplexed data on the basis of the first and second image data and the distance, respectively, by respectively multiplexing the first and second image data and first and second distance data, which are generated on the basis of the first and second distance information and indicate the distance to the subject for each of predefined pixel blocks in the first and second image data, respectively; and a compression processing section for reducing amounts of the first and second multiplexed data to generate compressed data. The compression processing section generates the compressed data by extracting long-distance blocks in the first and second image data on the basis of the first and second distance data, respectively, calculating a differential between the long-distance blocks in the first and second multiplexed data, and deleting the long-distance blocks in the first or second multiplexed data which are identical to their counterparts in the other multiplexed data.

3 Claims, 6 Drawing Sheets

LEFT-EYE IMAGE     RIGHT-EYE IMAGE

☐ LONG-DISTANCE BLOCK
▨ SHORT-DISTANCE BLOCK
⊠ LONG-DISTANCE BLOCK EXISTING ONLY IN RIGHT-EYE IMAGE

LEFT-EYE IMAGE

RIGHT-EYE IMAGE

☐ LONG-DISTANCE BLOCK

▨ SHORT-DISTANCE BLOCK

⊠ LONG-DISTANCE BLOCK EXISTING ONLY IN RIGHT-EYE IMAGE

FIG. 3A

LEFT-EYE IMAGE T1

FIG. 3B

RIGHT-EYE IMAGE T1

CALCULATE DIFFERENTIAL FOR COMPRESSION

DIFFERENTIAL IS NOT CALCULATED, BECAUSE INFORMATION FROM LEFT-EYE IMAGE WHICH HAS BEEN ENCODED IS USED

FIG. 3C

LEFT-EYE IMAGE T2

FIG. 3D

RIGHT-EYE IMAGE T2

☐ LONG-DISTANCE BLOCK

▨ SHORT-DISTANCE BLOCK

⊠ LONG-DISTANCE BLOCK EXISTING ONLY IN RIGHT-EYE IMAGE

IMAGE PORTION OF 205C

FIG. 6B

IMAGE PORTION OF 205D

FIG. 6C

IMAGE PORTION OF 205E

FIG. 6D

IMAGE PORTION OF 205F

☐ LONG-DISTANCE BLOCK

▨ SHORT-DISTANCE BLOCK

⊠ LONG-DISTANCE BLOCK EXISTING ONLY IN RIGHT-EYE IMAGE

IMAGE COMPRESSION APPARATUS AND IMAGE COMPRESSION METHOD

BACKGROUND OF THE INVENTION

1. Field of the Invention

The present invention relates to an image compression apparatus and method that measures the distance to a subject when capturing an image.

2. Description of the Related Art

Various techniques have been developed to impart presence to moving image data.

Presence can be imparted to moving image data by, for example, reproducing a three-dimensional image.

A three-dimensional image may be generated by, for example, acquiring two image data of the same subject from the viewpoints of the left and right eyes. When reproducing the three-dimensional image data, the image data for the left eye is to be viewed by the left eye while the image data for the right eye is to be viewed by the right eye. Hereinafter, image data acquired from the viewpoints of the left and right eyes are referred to as "parallax images".

The simplest way to generate parallax images is to install two cameras at positions corresponding to the left and right eyes to capture two images. However, it takes significant effort and cost to capture images using this method. Therefore, a technique for generating three-dimensional image data on the basis of two-dimensional moving image data acquired with a single camera has been desired.

In order to generate three-dimensional image data on the basis of a single two-dimensional image, two parallax images are generated from the single two-dimensional image.

In order to generate two parallax images from a single two-dimensional image, distance information indicating the distance to each subject in the two-dimensional image data has been used to date.

To obtain the distance information, a human may view an image to estimate the distance from the viewpoint (camera position), at which the image was captured, to the subject. Disadvantageously, however, it may be difficult to automate this scheme, since a human estimates the distance.

Therefore, there has been desired a technique for automatically measuring the distance to a subject when generating a two-dimensional image.

Japanese Unexamined Patent Application Publication No. Hei 08-70473 (JP-A-Hei 08-70473) discloses a technique for automatically measuring the distance to a subject when generating a single two-dimensional image to provide image data with distance information.

SUMMARY OF THE INVENTION

However, the technique disclosed in JP-A-Hei 08-70473 generates an excessive amount of image data with distance information, which makes it difficult to store such image data in a storage medium. Because each pixel in the image data is provided with the distance information in the technique disclosed in JP-A-Hei 08-70473, the amount of information regarding distance may be about as large as the amount of information regarding the image data itself. Therefore, image data with distance information, even if compressed, may be of a much larger amount than image data without distance information.

In addition, since the distance is measured for each pixel in the technique disclosed in JP-A-Hei 08-70473, the distance measurement process may be burdensome, disadvantageously making it difficult to apply the technique to moving image data.

It is desirable to provide an image compression apparatus and an image compression method that makes the distance measurement process less burdensome and that generates image data with distance information of a smaller amount.

According to an embodiment of the present invention, there is provided an image compression apparatus including: a first imaging section for capturing an image of a subject to generate a first image signal; a second imaging section for capturing an image of the subject to generate a second image signal; a first encoding section for encoding the first image signal generated by the first imaging section to generate first image data; a second encoding section for encoding the second image signal generated by the second imaging section to generate second image data; a first distance measuring section for measuring a distance to the subject for each of image blocks, at the same time as the first imaging section performs image capturing, to generate first distance information; a second distance measuring section for measuring a distance to the subject for each of image blocks, at the same time as the second imaging section performs image capturing, to generate second distance information; a first multiplexing section for generating first multiplexed data on the basis of the first image data generated by the first encoding section and the distance measured by the first distance measuring section, the first multiplexed data being generated by multiplexing first distance data and the first image data, the first distance data being generated on the basis of the first distance information and indicating the distance to the subject for each of predefined pixel blocks in the first image data; a second multiplexing section for generating second multiplexed data on the basis of the second image data generated by the second encoding section and the distance measured by the second distance measuring section, the second multiplexed data being generated by multiplexing second distance data and the second image data, the second distance data being generated on the basis of the second distance information and indicating the distance to the subject for each of predefined pixel blocks in the second image data; and a compression processing section for reducing amounts of the first multiplexed data and the second multiplexed data to generate compressed data. The compression processing section generates the compressed data by extracting long-distance blocks, in which the distance to the subject is larger than a predetermined threshold, in the first image data on the basis of the first distance data contained in the first multiplexed data generated by the first multiplexing section, extracting long-distance blocks in the second image data on the basis of the second distance data contained in the second multiplexed data generated by the second multiplexing section, calculating a differential between the long-distance blocks in the first multiplexed data and the long-distance blocks in the second multiplexed data, and deleting the long-distance blocks in the first multiplexed data or the long-distance blocks in the second multiplexed data which are identical to their counterparts in the other multiplexed data.

According to another embodiment of the present invention, there is provided an image compression method including the steps of: capturing an image of a subject to generate first and second image signals, and at the same time, measuring a distance to the subject for each of image blocks to generate first and second distance information; encoding the first and second image signals generated in the image capturing and measuring step to generate first and second image data; generating first multiplexed data by multiplexing first distance data and the first image data, the first distance data being generated on the basis of the first distance information and indicating the distance to the subject for each of predefined pixel blocks in the first image data, and generating second multiplexed data by multiplexing second distance data and the second image data, the second distance data being generated on the basis of the second distance information and indicating the distance to the subject for each of predefined pixel blocks in the second image data; and generating compressed data by extracting long-distance blocks, in which the distance to the subject is larger than a predetermined threshold, in the first image data on the basis of the first distance data contained in the first multiplexed data, extracting long-distance blocks in the second image data on the basis of the second distance data contained in the second multiplexed data, calculating a differential between the long-distance blocks in the first multiplexed data and the long-distance blocks in the second multiplexed data, and deleting the long-distance blocks in the first multiplexed data or the long-distance blocks in the second multiplexed data which are identical to their counterparts in the other multiplexed data.

DESCRIPTION OF THE PREFERRED EMBODIMENTS

Hereinafter, a description will be made regarding embodiments of the present invention.

<First Embodiment>

Figure 1:
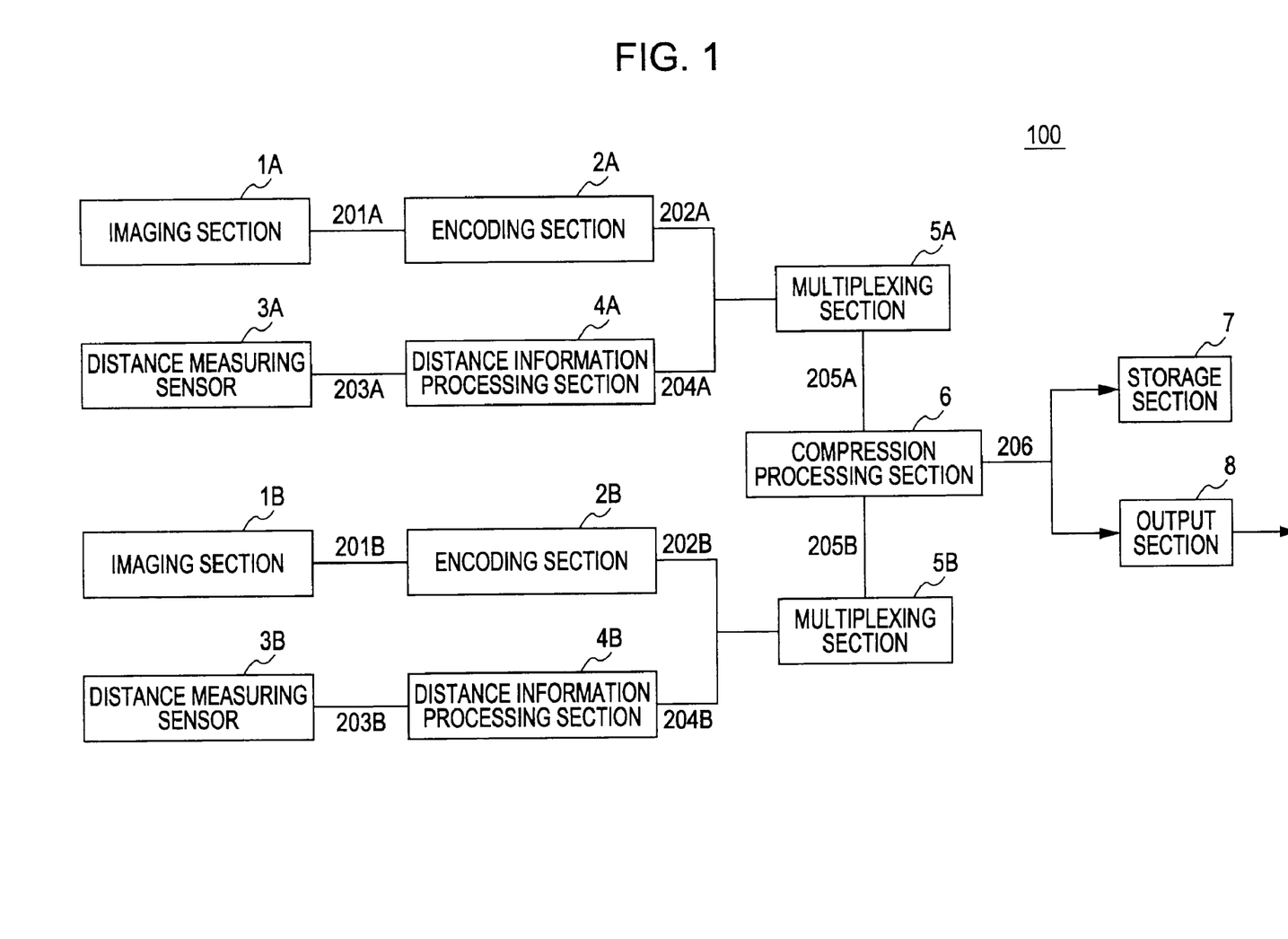
FIG. 1 is a block diagram showing an exemplary configuration of an image compression apparatus according to a first embodiment.

FIG. 1 is a block diagram showing an exemplary configuration of an image compression apparatus 100 according to a first embodiment.

As shown in FIG. 1, the image compression apparatus 100 of the first embodiment includes an imaging section 1A (corresponding to a first imaging section of the present invention), an imaging section 1B (corresponding to a second imaging section of the present invention), an encoding section 2A (corresponding to a first encoding section of the present invention), an encoding section 2B (corresponding to a second encoding section of the present invention), a distance measuring sensor 3A (corresponding to a first distance measuring section of the present invention), a distance measuring sensor 3B (corresponding to a second distance measuring section of the present invention), a distance information processing section 4A, a distance information processing section 4B, a multiplexing section 5A (corresponding to a first multiplexing section of the present invention), a multiplexing section 5B (corresponding to a second multiplexing section of the present invention), a compression processing section 6 (corresponding to a compression processing section of the present invention), a storage section 7, and an output section 8.

As discussed above, the image compression apparatus 100 of the first embodiment includes two imaging sections, two encoding sections, two distance measuring sensors, two distance information processing sections, and two multiplexing sections. The configuration allows the acquisition of two image data, that is, image data to be viewed with the right eye and image data to be viewed with the left eye.

The following describes the details of the respective components.

The imaging section 1A captures an image of a subject to generate an image signal 201A, and may be an imaging device such as a digital still camera or a digital video camera.

The encoding section 2A compresses the image signal 201A generated by the imaging section 1A for conversion into digital image data 202A. The encoding section 2A may use an image encoding technique such as MPEG1, MPEG2, MPEG4, DivX (a registered trademark of Divx, Inc.), Xvid and WMV9, for example. In this embodiment, the encoding section 2A uses MPEG as the image encoding technique.

The distance measuring sensor 3A is attached to the imaging section 1A, and measures the distance to the subject when the imaging section 1A captures an image of the subject and outputs the measured distance as distance information 203A. The distance measuring sensor 3A may be a sensor for measuring the distance by infrared rays or ultrasonic waves, for example. The distance measuring sensor 3A measures the distance to the subject for pixels extracted from predefined pixel blocks composed of all the pixels of the imaging section 1A.

The distance measuring sensor 3A may use macro blocks (16×16 pixels) used in MPEG1 and MPEG 1 and blocks (8×8 pixels), for example, for the above-mentioned predefined pixel blocks. That is, in the case where distance measurement is performed for each macro block, for example, each distance measuring element of the distance measuring sensor 3A may be provided for every 16×16 pixels of the imaging section 1A.

That is, in the case where distance measurement is performed for each macro block, for example, the distance measuring sensor 3 may be prepared that has the same number of distance measuring elements as the number of the macro blocks in the digital image data 202A generated by the encoding section 2A. The plurality of distance measuring elements of the distance measuring sensor 3A may be arranged in a matrix so as to correspond to the respective macro blocks, for example.

The distance information processing section 4A generates distance data 204A on the basis of the distance information 203A generated by the distance measuring sensor 3A. Since the distance data 204A generated by the distance information processing section 4A is based on the distance information 203A generated by the distance measuring sensor 3A, the distance data 204A is generated for each predefined pixel block in the digital image data 202A generated by the encoding section 2A.

The multiplexing section 5A multiplexes the digital image data 202A generated by the encoding section 2A and the distance data 204A generated by the distance information processing section 4A to generate multiplexed data 205A. In the multiplexed data 205A, each predefined pixel block in the digital image data 202A has been embedded with the distance data 204A corresponding to that block, for example.

The configurations of the imaging section 1B through to the multiplexing section 5B are substantially the same as the configurations of the above-mentioned imaging section 1A through to the multiplexing section 5A, respectively. It should be noted, however, that the imaging section 1B generates an image signal 201B, the encoding section 2B generates digital image data 202B, the distance measuring sensor 3B generates distance information 203B, the distance information processing section 4B generates distance data 204B, and the multiplexing section 5B generates multiplexed data 205B.

The imaging sections 1A and 1B are configured to perform image capturing simultaneously. This is because the imaging section 1A captures an image of the subject to be viewed with the right eye and the imaging section 1B captures an image of the subject to be viewed with the left eye, for example, in order to generate a three-dimensional image on the basis of two parallax images. In addition, the imaging sections 1A and 1B are located at equal distances from the subject.

The compression processing section 6 recompresses the multiplexed data 205A and 205B to generate compressed data 206 of a smaller amount. A compression scheme used by the compression processing section 6 will be described in detail later.

The storage section 7 is a memory for storing the compressed data 206 generated by the compression processing section 6.

The output section 8 outputs the compressed data 206 generated by the compression processing section 6 to the outside via a predetermined transmission path. On the basis of the output compressed data 206, a three-dimensional image generation apparatus (not shown) generates three-dimensional image data, for example. It should be noted, however, that the present invention does not limit how three-dimensional image data is generated on the basis of the compressed data 206. For example, three-dimensional image data may be generated utilizing a technique used in the past.

Now, a description is made regarding how the compression processing section 6 recompresses the two multiplexed data 205A and 205B.

Figures 2A, 2B:
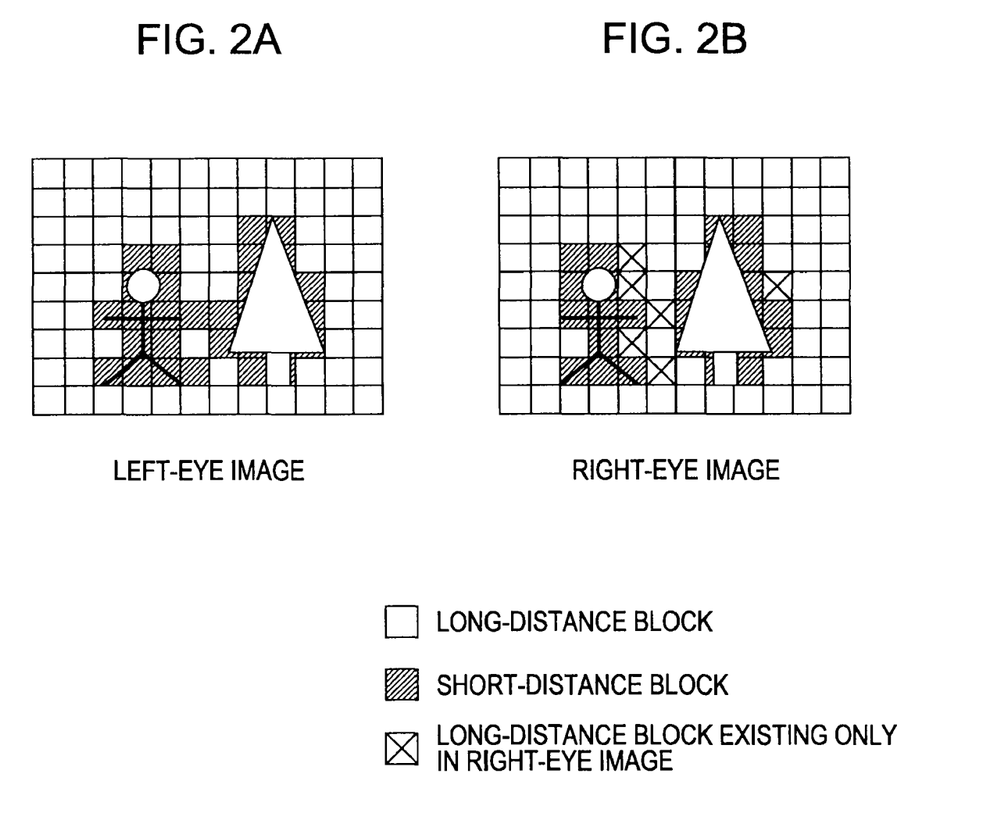
FIG. 2A illustrates how a compression processing section of the first embodiment compresses two multiplexed data on the basis of distance data, showing an image portion of one of the multiplexed data.
FIG. 2B illustrates how the compression processing section of the first embodiment compresses the two multiplexed data on the basis of the distance data, showing an image portion of the other of the multiplexed data.

FIG. 2 illustrates how the two multiplexed data 205A and 205B are compressed on the basis of the distance data 204A and 204B.

FIG. 2A shows an image portion of the multiplexed data 205A. In this embodiment, the multiplexed data 205A shown in FIG. 2A is an image to be viewed with the left eye (hereinafter referred to as "left-eye image"), of two parallax images.

The image shown in FIG. 2A has been compression-encoded (in this embodiment, using MPEG) by the encoding section 2A. Each block shown in FIG. 2A (in this embodiment, a macro block of 16×16 pixels) has been provided with the distance data 204A for that block, which indicates the distance to the subject captured in that block.

In FIG. 2A, the blocks in which the distance to the subject is short are colored in gray while the blocks in which the distance to the subject is long are colored in white. The compression processing section 6 determines whether the distance to the subject is short or long by referencing the distance data 204A for each block. Whether the distance to the subject indicated by the distance data 204A is short or long may be determined according to whether the distance is shorter or longer than a fixed threshold of, for example, 20 meters. The threshold may be varied and may be, for example, a value obtained by doubling the average distance to the subject for all the blocks in an image. In the case where a block includes both the subject at a short distance and a background at a long distance, the distance for that block may be determined as short.

FIG. 2B shows an image portion of the multiplexed data 205B. In this embodiment, the multiplexed data 205B shown in FIG. 2B is an image to be viewed with the right eye (hereinafter referred to as "right-eye image"), of two parallax images. Also in FIG. 2B, the blocks in which the distance to the subject is short are colored in gray while the blocks in which the distance to the subject is long are colored in white.

The compression processing section 6 calculates the differential between the blocks in which the distance to the subject is long (hereinafter referred to as "long-distance blocks") in the right-eye image shown in FIG. 2B and the long-distance blocks in the left-eye image shown in FIG. 2A. The X-marked blocks shown in FIG. 2B are long-distance blocks extracted as the differential, that is, long-distance blocks existing only in the right-eye image shown in FIG. 2B.

Then, the compression processing section 6 eliminates the long-distance blocks in the right-eye image shown in FIG. 2B which are identical to their counterparts in the left-eye image shown in FIG. 2A. That is, the long-distance blocks existing in both the right-eye image and the left-eye image are eliminated from one of the images. When the image with the eliminated long-distance blocks is to be decompressed, the long-distance blocks in the other image corresponding to the eliminated long-distance blocks are referenced and copied to substitute for the eliminated long-distance blocks. Information for allowing reference to the remaining long-distance blocks corresponding to the eliminated long-distance blocks is referred to as "reference information". The present invention does not limit the format and style of the reference information.

Thus, the compressed data generated by the compression processing section 6 contains, as the image portion, data associated with short-distance blocks, data associated with long-distance blocks common to the left and right images, and data associated with long-distance blocks that are not common to the left and right images.

Since data (image data and distance data) for long-distance blocks in one of two parallax images can be eliminated in this way, the amount of information can be reduced significantly.

In the description above, common long-distance blocks in the right-eye image are eliminated while long-distance blocks in the left-eye image are reserved for reference. However, the present invention is not limited thereto, and conversely common long-distance blocks in the left-eye image may be eliminated while long-distance blocks in the right-eye image may be reserved for reference.

The compression process performed by the compression processing section 6 is also effective for temporal compression.

FIG. 3 illustrates the temporal compression effect of the compression process performed by the compression processing section 6.

Figure 3A:
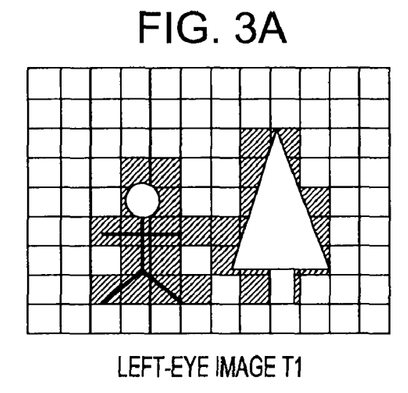
FIG. 3A illustrates the temporal compression effect of a compression process performed by the compression processing section, showing an image portion of the one of the multiplexed data generated at a first time.
Figure 3B:
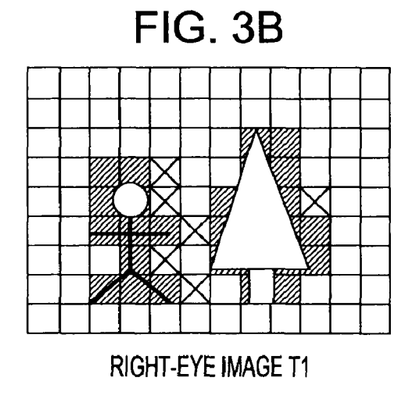
FIG. 3B illustrates the temporal compression effect of the compression process performed by the compression processing section, showing an image portion of the other of the multiplexed data generated at the same time as the image portion of FIG. 3A.

FIG. 3A shows an image portion of the multiplexed data 205A generated at a first time, hereinafter referred to as "left-eye image T1". FIG. 3B shows an image portion of the multiplexed data 205B generated at the same time as the left-eye image of FIG. 3A, hereinafter referred to as "right-eye image T1".

Figure 3C:
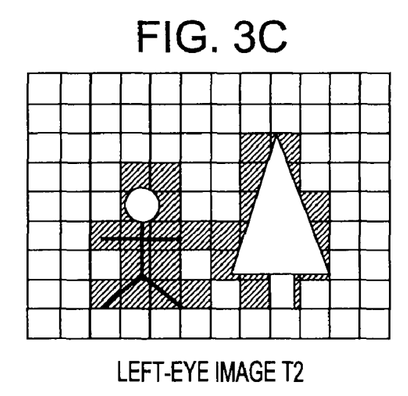
FIG. 3C illustrates the temporal compression effect of the compression process performed by the compression processing section, showing an image portion of the one of the multiplexed data generated at a second time later than the first time.
Figure 3D:
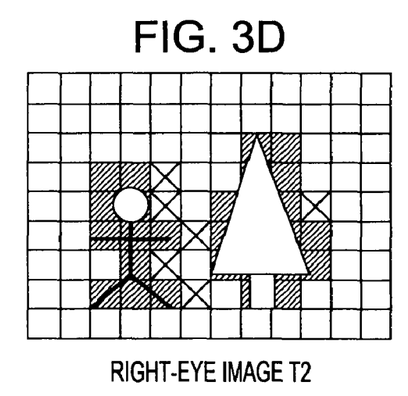
FIG. 3D illustrates the temporal compression effect of the compression process performed by the compression processing section, showing an image portion of the other of the multiplexed data generated at the same time as the image portion of FIG. 3C.

FIG. 3C shows an image portion of the multiplexed data 205A generated at a second time later than the first time (for example, in the next frame), hereinafter referred to as "left-eye image T2". FIG. 3D shows an image portion of the multiplexed data 205B generated at the same time as the left-eye image of FIG. 3C, hereinafter referred to as "right-eye image T2".

The compression processing section 6 calculates the differential between the left-eye image T1 shown in FIG. 3A and the left-eye image T2 shown in FIG. 3C to perform temporal compression by a motion compensation technique, for example. That is, the long-distance blocks in the left-eye image T2 which are identical to their counterparts in the left-eye image T1 are eliminated, and reference information for allowing reference to the blocks in the left-eye image T1 in order to reproduce the corresponding eliminated long-distance blocks in the left-eye image T2 is provided in place.

For the right-eye images T1 and T2, meanwhile, the compression processing section 6 does not calculate the differential, but only performs compression by eliminating long-distance blocks referencing the respective left-eye images.

In the case where the differential between the right-eye images T1 and T2 is calculated to perform temporal compression, eliminated blocks in the right-eye image T2 are decoded by referencing the corresponding blocks in the right-eye image T1, which in turn are obtained by referencing the left-eye image T1. In this case, errors that occur during the differential calculations accumulate, which might lower the accuracy of differential substitution and thus degrade the quality of an image to be reproduced. Therefore, the compression processing section 6 does not calculate the temporal differential for the right-eye images, but compresses the right-eye images by referencing the left-eye images, effectively reducing the amount of information.

Now, a description will be made regarding an exemplary operation to generate a three-dimensional image of the image compression apparatus 100 according to the first embodiment.

Figure 4:
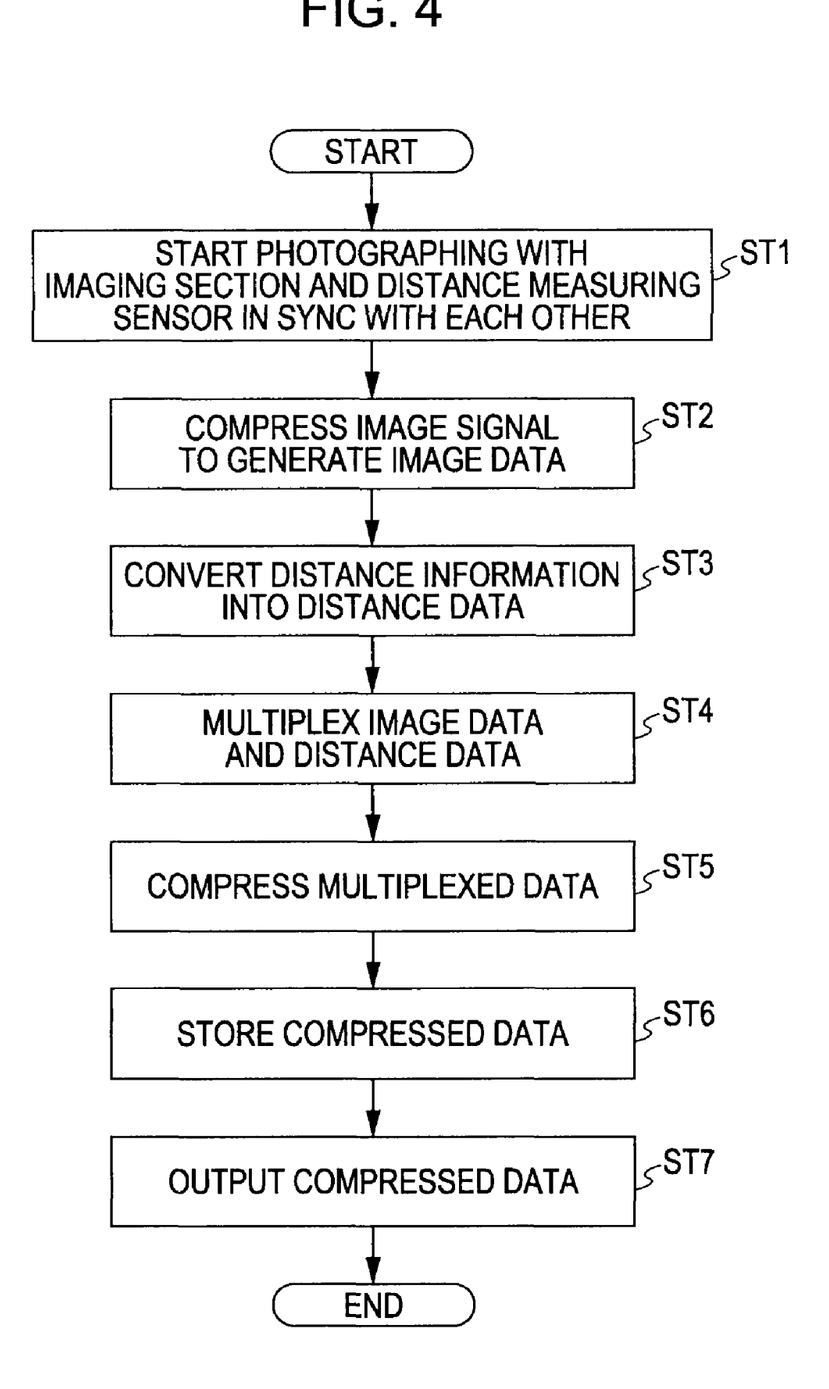
FIG. 4 is a flowchart illustrating an exemplary operation to generate a three-dimensional image of the image compression apparatus according to the first embodiment.

FIG. 4 is a flowchart illustrating an exemplary operation to generate a three-dimensional image of the image compression apparatus 100 according to the first embodiment.

Step ST1:
The imaging section 1A and the distance measuring sensor 3A operate in sync with each other to capture an image of a subject and measure the distance to the subject, respectively, at the same time. The imaging section 1A generates an image signal 201A, and the distance measuring sensor 3A generates distance information 203A. Also at the same time, the imaging section 1B and the distance measuring sensor 3B operate in sync with each other to generate an image signal 201B and distance information 203B, respectively.

Step ST2:
The encoding section 2A (2B) compression-encodes the image data 201A (201B) generated by the imaging section 1A (1B) using an image encoding technique such as MPEG to generate digital image data 202A (202B).

Step ST3:
The distance information processing section 4A (4B) converts the distance information 203A (203B) indicating the distance measured by the distance measuring sensor 3A (3B) in step ST1 into distance data 204A (204B).

Step ST4:
The multiplexing section 5A (5B) multiplexes the digital image data 202A (202B) generated in step ST2 and the distance data 204A (204B) generated in step ST3 for each predefined pixel block and each frame to generate multiplexed data 205A (205B). Examples of a multiplexing scheme include embedding the distance data 204A (204B) into a header portion of the digital image data 202A (202B), for example.

Step ST5:
The compression processing section 6 compresses (reduces the amount of information of) the multiplexed data 205A and 205B generated in step ST4 to generate compressed data 206.

Step ST6:
The storage section 7 stores the compressed data 206 generated in step ST5.

Step ST7:
The output section 8 outputs the compressed data 206 generated in step ST5 through a predetermined transmission path.

It should be noted that steps ST6 and ST7 may be performed in a different order. That is, the output section 8 may output the compressed data 206 before, or at the same time as, the short-distance block 7 stores the compressed data 206.

As has been described above, in the image compression apparatus 100 of the first embodiment, the encoding section 2A (2B) compresses the image signal 201A (201B) indicating the image captured by the imaging section 1A (1B) to generate digital image data 202A (202B). The distance measuring sensor 3A (3B) measures the distance to the subject at the same time as the imaging section 1A (1B) performs image capturing to generate distance information 203A (203B). The distance information processing section 4A (4B) generates distance data 204A (204B) on the basis of the distance information 203A (203B). The multiplexing section 5A (5B) multiplexes the digital image data 202A (202B) and the distance data 204A (204B) to generate multiplexed data 205A (205B). The compression processing section 6 eliminates long-distance blocks in one of the multiplexed data 205A and 205B on the basis of the multiplexed data 205A and 205B to generate compressed data 206 of a smaller amount.

According to the image compression apparatus 100 of the first embodiment, when multiplexing image data for two parallax images and distance data corresponding to the image data to generate multiplexed data, image data and corresponding distance data for long-distance portions in one of the parallax images are eliminated. Thus, it is possible to significantly reduce the amount of information of the multiplexed data, reducing the possibility that a large proportion of the capacity of the storage section 7 is taken up when it stores the compressed data 206 and a large proportion of the bandwidth of the output transmission path of the output section 8 is taken up when it outputs the compressed data 206.

<Second Embodiment>

Hereinafter, a description will be made regarding an image compression apparatus 101 according to a second embodiment of the present invention.

Figure 5:
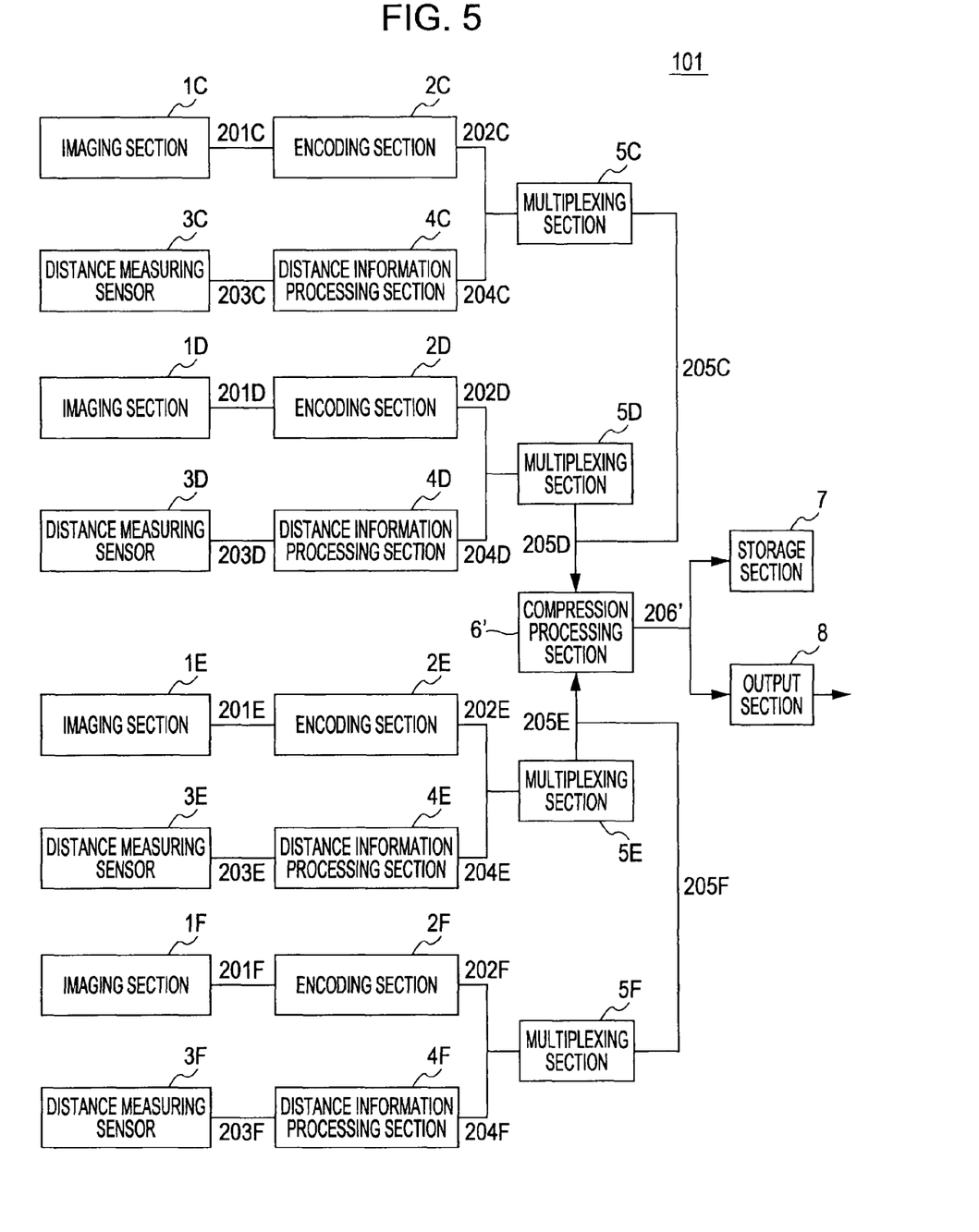
FIG. 5 shows an exemplary configuration of an image compression apparatus according to a second embodiment.

An exemplary configuration of the image compression apparatus 101 according to the second embodiment is shown in FIG. 5.

FIG. 5 shows an exemplary configuration of the image compression apparatus 101 according to the second embodiment.

As shown in FIG. 5, the image compression apparatus 101 of the second embodiment includes imaging sections 1C, 1D, 1E, 1F, encoding sections 2C, 2D, 2E, 2F, distance measuring sensors 3C, 3D, 3E, 3F, distance information processing sections 4C, 4D, 4E, 4F, multiplexing sections 5C, 5D, 5E, 5F, a compression processing section 6', a storage section 7, and an output section 8.

The image compression apparatus 101 of the second embodiment is different from the image compression apparatus 100 of the first embodiment in including four imaging sections, four encoding sections, four distance measuring sensors, four distance information processing sections, and four multiplexing sections as shown in FIG. 5. Components other than those mentioned above (the compression processing section 6', the storage section 7 and the output section 8) are substantially the same between the image compression apparatus 101 of the second embodiment and the image compression apparatus 100 of the first embodiment.

The following describes the details of the respective components of the image compression apparatus 101 of the second embodiment while focusing on the differences from the respective counterparts of the image compression apparatus 100 of the first embodiment.

The imaging sections 1C, 1D, 1E, 1F capture an image of a subject to generate image signals 201C, 201D, 201E, 201F, respectively, and each may be an imaging device such as a digital still camera and a digital video camera, for example.

The imaging sections 1C and 1D are located at equal distances from the subject. The imaging sections 1E and 1F are also located at equal distances from the subject. It should be noted, however, that the imaging section 1C (1D) and the imaging section 1E (1F) are located at different distances from the subject. Specifically, the imaging sections 1E and 1F may be located farther to the subject by a predetermined distance than the imaging sections 1C and 1D, for example. With the configuration, image signals for two distances can be generated when capturing an image of a single subject.

The encoding sections 2C, 2D, 2E, 2F compress the image signals 201C, 201D, 201E, 201F generated by the imaging sections 1C, 1D, 1E, 1F for conversion into digital image data 202C, 202D, 202E, 202F, respectively. The encoding sections 2C, 2D, 2E, 2F may use an image encoding technique such as MPEG1, MPEG2, MPEG4, DivX (a registered trademark of Divx, Inc.), Xvid and WMV9, for example.

The distance measuring sensors 3C, 3D, 3E, 3F are attached to the imaging sections 1C, 1D, 1E, 1F, and measure the distance to the subject when the imaging sections 1C, 1D, 1E, 1F capture an image of the subject and output the measured distance as distance information 203C, 203D, 203E, 203F, respectively. The distance measuring sensors 3C, 3D, 3E, 3F may each be a sensor for measuring the distance by infrared rays or ultrasonic waves, for example. The distance measuring sensors 3C, 3D, 3E, 3F measure the distance to the subject for pixels extracted from predefined pixel blocks composed of all the pixels of the imaging sections 1C, 1D, 1E, 1F, respectively.

The distance measuring sensors 3C, 3D, 3E, 3F may use macro blocks (16×16 pixels) used in MPEG1 and MPEG 1 and blocks (8×8 pixels), for example, for the above-mentioned predefined pixel blocks, as may be done by the distance measuring sensors 3A and 3B of the first embodiment. That is, in the case where distance measurement is performed for each macro block, for example, each distance measuring element of the distance measuring sensors 3C, 3D, 3E, 3F may be provided for every 16×16 pixels of the imaging sections 1C, 1D, 1E, 1F, respectively.

That is, in the case where distance measurement is performed for each macro block, for example, the distance measuring sensors 3C, 3D, 3E, 3F may be prepared that have the same number of distance measuring elements as the number of the macro blocks in the digital image data 202C, 202D, 202E, 202F generated by the encoding sections 2C, 2D, 2E, 2F, respectively. The plurality of distance measuring elements of the distance measuring sensors 3C, 3D, 3E, 3F may be arranged in a matrix so as to correspond to the respective macro blocks, for example.

The distance measuring sensors 3C and 3D are located at different distances from the subject than the distance measuring sensors 3E and 3F. Therefore, the number of distance measuring elements of the distance measuring sensors may be varied in accordance with the distance from the subject, for example. That is, the number of distance measuring elements may be increased for distance measuring sensors located closer to the subject while the number of distance measuring elements may be reduced for distance measuring sensors located farther to the subject.

The distance information processing sections 4C, 4D, 4E, 4F generate distance data 204C, 204D, 204E, 204F on the basis of the distance information 203C, 203D, 203E, 203F generated by the distance measuring sensors 3C, 3D, 3E, 3F, respectively. Since the distance data 204C, 204D, 204E, 204F generated by the distance information processing sections 4C, 4D, 4E, 4F are based on the distance information 203C, 203D, 203E, 203F generated by the distance measuring sensors 3C, 3D, 3E, 3F, respectively, the distance data 204C, 204D, 204E, 204F are generated for each predefined pixel block in the digital image data 202C, 202D, 202E, 202F generated by the encoding sections 2C, 2D, 2E, 2F, respectively.

The multiplexing sections 5C, 5D, 5E, 5F multiplex the digital image data 202C, 202D, 202E, 202F generated by the encoding sections 2C, 2D, 2E, 2F and the distance data 204C, 204D, 204E, 204F generated by the distance information processing sections 4C, 4D, 4E, 4F to generate multiplexed data 205C, 205D, 205D, 205F, respectively. In the multiplexed data 205C, 205D, 205E, 205F, each predefined pixel block in the digital image data 202C, 202D, 202E, 202F has been embedded with the distance data 204C, 204D, 204E, 204F corresponding to that block, respectively, for example.

The compression processing section 6' recompresses the multiplexed data 205C, 205D, 205E, 205F to generate compressed data 206' of a smaller amount. A compression scheme used by the compression processing section 6' will be described in detail later.

The storage section 7 is a memory for storing the compressed data 206' generated by the compression processing section 6'.

The output section 8 outputs the compressed data 206' generated by the compression processing section 6' to the outside via a predetermined transmission path.

With the image compression apparatus 101 of the second embodiment configured as discussed above, two parallax images can be obtained at two distances. This allows the generation of a more stereoscopic three-dimensional image based on the compressed data generated by the image compression apparatus 101 of the second embodiment.

The following describes the compression process performed by the compression processing section 6' of the second embodiment.

FIG. 6 illustrates how the four multiplexed data 205C, 205D, 205E, 205F are compressed on the basis of the distance data 204C, 204B, 204E, 204F embedded in the respective multiplexed data.

Figure 6A:
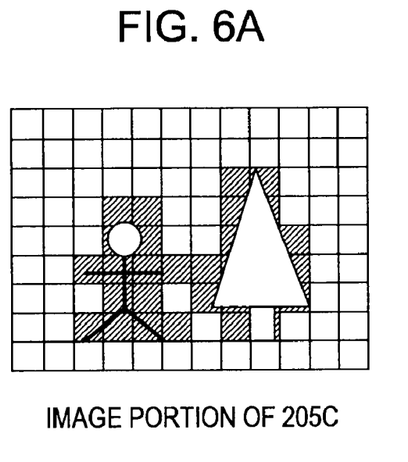
FIG. 6A illustrates how a compression processing section of the second embodiment compresses four multiplexed data on the basis of distance data embedded in the respective multiplexed data, showing an image portion of first multiplexed data.

FIG. 6A shows an image portion of the multiplexed data 205C. In the second embodiment, the multiplexed data 205C shown in FIG. 6A is an image to be viewed with the left eye (left-eye image), of four parallax images.

The image shown in FIG. 6A has been compression-encoded (in this embodiment, using MPEG) by the encoding section 2C. Each block shown in FIG. 6A (in this embodiment, a macro block of 16×16 pixels) has been provided with the distance data 204C for that block, which indicates the distance to the subject captured in that block.

In FIG. 6A, the blocks in which the distance to the subject is short are colored in gray while the blocks in which the distance to the subject is long are colored in white. The compression processing section 6' determines whether the distance to the subject is short or long by referencing the distance data 204C for each block. Whether the distance to the subject indicated by the distance data 204A is short or long may be determined according to whether the distance is shorter or longer than a fixed threshold of, for example, 20 meters. The threshold may be varied and may be, for example, a value obtained by doubling the average distance to the subject for all the blocks in an image. In the case where a block includes both the subject at a short distance and a background at a long distance, the distance for that block may be determined as short.

Figure 6B:
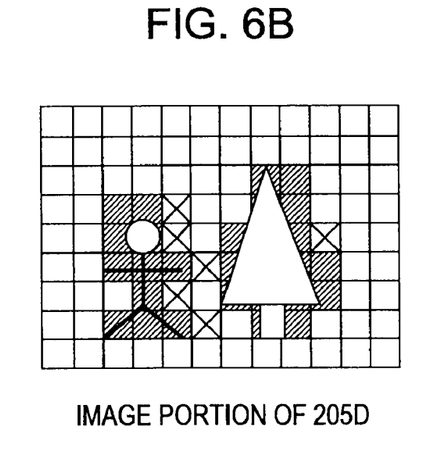
FIG. 6B illustrates how the compression processing section of the second embodiment compresses the four multiplexed data on the basis of the distance data embedded in the respective multiplexed data, showing an image portion of second multiplexed data.

FIG. 6B shows an image portion of the multiplexed data 205D. In this embodiment, the multiplexed data 205D shown in FIG. 6B is an image to be viewed with the right eye (right-eye image), of four parallax images. Also in FIG. 6B, the blocks in which the distance to the subject is short are colored in gray while the blocks in which the distance to the subject is long are colored in white.

Figure 6C:
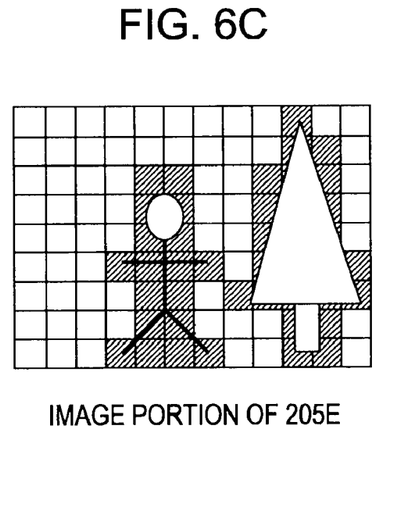
FIG. 6C illustrates how the compression processing section of the second embodiment compresses the four multiplexed data on the basis of the distance data embedded in the respective multiplexed data, showing an image portion of third multiplexed data.

FIG. 6C shows an image portion of the multiplexed data 205E. In this embodiment, the multiplexed data 205E shown in FIG. 6C is a left-eye image captured at a different distance than the multiplexed data 205C. When the distance from the imaging sections 1C and 1D to the subject at the time when the image signals for the multiplexed data 205C and 205D were generated is defined as a first distance L1 and the distance from the imaging section 1E to the subject at the time when the image signal for the multiplexed data 205E was generated is defined as a second distance L2, then the relation L1<L2 is satisfied. Also in FIG. 6C, the blocks in which the distance to the subject is short are colored in gray while the blocks in which the distance to the subject is long are colored in white.

Figure 6D:
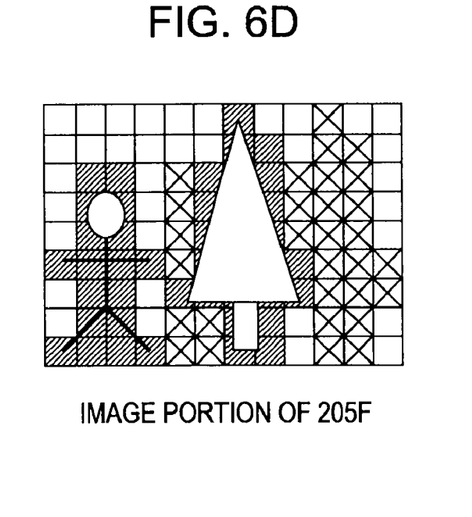
FIG. 6D illustrates how the compression processing section of the second embodiment compresses the four multiplexed data on the basis of the distance data embedded in the respective multiplexed data, showing an image portion of fourth multiplexed data.

FIG. 6D shows an image portion of the multiplexed data 205F. In this embodiment, the multiplexed data 205F shown in FIG. 6D is a right-eye image captured at the second distance L2, as with the multiplexed data 205E. Also in FIG. 6D, the blocks in which the distance to the subject is short are colored in gray while the blocks in which the distance to the subject is long are colored in white.

As shown in FIGS. 6A and 6B, the compression processing section 6' extracts long-distance blocks from the image portions of the multiplexed data 205C and 205D, which contain image signals obtained at the first distance L1, by the same compression process as in the first embodiment. Then, the compression processing section 6' calculates the differential between the image portions of the multiplexed data 205C and 205D to eliminate the long-distance blocks in the multiplexed data 205D which are identical to their counterparts in the multiplexed data 205C. At this time, reference information for allowing reference to the remaining long-distance blocks corresponding to the eliminated long-distance blocks is provided in place. As a matter of course, the blocks which are not identical are left as they are.

Likewise, as shown in FIGS. 6C and 6D, the compression processing section 6' extracts long-distance blocks from the image portions of the multiplexed data 205E and 205F, which contain image signals obtained at the second distance L2. Then, the compression processing section 6' calculates the differential between the image portions of the multiplexed data 205E and 205F to eliminate the long-distance blocks in one of the multiplexed data which are identical to their counterparts in the other, reducing the amount of information. Also, reference information for allowing reference to the remaining long-distance block corresponding to the eliminated long-distance blocks is provided in place.

Then, the compression processing section 6' calculates the differential between the image portion of the multiplexed data 205C shown in FIG. 6A and the image portion of the multiplexed data 205E shown in FIG. 6C to eliminate the long-distance blocks which are identical between the multiplexed data from one of the multiplexed data. The elimination is performed on the assumption that the difference between the first distance L1 and the second distance L2 is not so large and, thus, there is not a great difference between the long-distance blocks in the multiplexed data 205C obtained at the first distance L1 and the long-distance blocks in the multiplexed data 205E obtained at the second distance L2. Thus, in the image compression apparatus 101 of the second embodiment, the imaging section 1C (1D) and the imaging section 1E (1F) are located such that there is not a great difference between the distance L1 from the imaging section 1C (1D) to the subject and the distance L2 from the imaging section 1E (1F) to the subject.

In this embodiment, the long-distance blocks in the multiplexed data 205E shown in FIG. 6C which are identical to their counterparts are eliminated, for example. At this time, the compression processing section 6' generates reference information for allowing reference to the long-distance blocks in the multiplexed data 205C corresponding to the eliminated long-distance blocks in the multiplexed data 205E, and provides the reference information in place of the eliminated long-distance blocks.

As has been described above, according to the image compression apparatus 101 of the second embodiment, the compression processing section 6' performs a compression process to eliminate long-distance blocks in the image portions of three multiplexed data, of the four multiplexed data 205C, 205D, 205E, 205F, and provide reference information for allowing reference to the remaining corresponding long-distance blocks. Therefore, the amount of information can be reduced significantly for the eliminated long-distance blocks.

The present invention is not limited to the above-described embodiments.

That is, the constituent elements of the above-described embodiments may be modified or altered in various ways without departing from the technical scope of the present invention or the scope of equivalents thereof in carrying out the present invention.

Although two imaging sections are located at the same distance from the subject and two additional imaging sections are located at a different distance from the subject in the image compression apparatus 101 of the second embodiment, the present invention is not limited thereto. That is, any number of pairs of imaging sections may be provided. In this case, the number of encoding sections, distance measuring sensors, distance information processing sections and multiplexing sections may be determined in accordance with the number of the imaging sections.

The present application contains subject matter related to that disclosed in Japanese Priority Patent Application JP 2008-167752 filed in the Japan Patent Office on Jun. 26, 2008, the entire content of which is hereby incorporated by reference.

What is claimed is:

1. An image compression apparatus comprising:
    a first imaging section for capturing an image of a subject to generate a first image signal;
    a second imaging section for capturing an image of the subject to generate a second image signal;
    a first encoding section for encoding the first image signal generated by the first imaging section to generate first image data;
    a second encoding section for encoding the second image signal generated by the second imaging section to generate second image data;
    a first distance measuring section for measuring a distance to the subject for each of image blocks, at the same time as the first imaging section performs image capturing, to generate first distance information;
    a second distance measuring section for measuring a distance to the subject for each of image blocks, at the same time as the second imaging section performs image capturing, to generate second distance information;
    a first multiplexing section for generating first multiplexed data on the basis of the first image data generated by the first encoding section and the distance measured by the first distance measuring section, the first multiplexed data being generated by multiplexing first distance data and the first image data, the first distance data being generated on the basis of the first distance information and indicating the distance to the subject for each of predefined pixel blocks in the first image data;
    a second multiplexing section for generating second multiplexed data on the basis of the second image data generated by the second encoding section and the distance measured by the second distance measuring section, the second multiplexed data being generated by multiplexing second distance data and the second image data, the second distance data being generated on the basis of the second distance information and indicating the distance to the subject for each of predefined pixel blocks in the second image data; and
    a compression processing section for reducing amounts of the first multiplexed data and the second multiplexed data to generate compressed data,
    wherein the compression processing section generates the compressed data by extracting long-distance blocks, in which the distance to the subject is larger than a predetermined threshold, in the first image data on the basis of the first distance data contained in the first multiplexed data generated by the first multiplexing section, extracting long-distance blocks in the second image data on the basis of the second distance data contained in the second multiplexed data generated by the second multiplexing section, calculating a differential between the long-distance blocks in the first multiplexed data and the long-distance blocks in the second multiplexed data, and deleting the long-distance blocks in the first multiplexed data or the long-distance blocks in the second multiplexed data which are identical to their counterparts in the other multiplexed data.

2. The image compression apparatus according to claim 1, wherein when deleting the long-distance blocks in the first multiplexed data or the long-distance blocks in the second multiplexed data which are identical to their counterparts in the other multiplexed data, the compression processing section generates reference information for allowing reference to the long-distance blocks in the other multiplexed data that are identical to the deleted long-distance blocks, and provides the compressed data with the generated reference information.

3. An image compression method comprising the steps of:
    capturing an image of a subject to generate first and second image signals, and at the same time, measuring a distance to the subject for each of image blocks to generate first and second distance information;
    encoding the first and second image signals generated in the image capturing and measuring step to generate first and second image data;
    generating first multiplexed data by multiplexing first distance data and the first image data, the first distance data being generated on the basis of the first distance information and indicating the distance to the subject for each of predefined pixel blocks in the first image data, and generating second multiplexed data by multiplexing second distance data and the second image data, the second distance data being generated on the basis of the second distance information and indicating the distance to the subject for each of predefined pixel blocks in the second image data; and
    generating compressed data by extracting long-distance blocks, in which the distance to the subject is larger than a predetermined threshold, in the first image data on the basis of the first distance data contained in the first multiplexed data, extracting long-distance blocks in the second image data on the basis of the second distance data contained in the second multiplexed data, calculating a differential between the long-distance blocks in the first multiplexed data and the long-distance blocks in the second multiplexed data, and deleting the long-distance blocks in the first multiplexed data or the long-distance blocks in the second multiplexed data which are identical to their counterparts in the other multiplexed data.

* * * * *